(12) United States Patent
Jeon

(10) Patent No.: US 8,121,546 B2
(45) Date of Patent: Feb. 21, 2012

(54) BLUETOOTH-ENABLED MOBILE TERMINAL AND FAST DEVICE CONNECTION METHOD THEREOF

(75) Inventor: Jong Hyeok Jeon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 584 days.

(21) Appl. No.: 12/327,021

(22) Filed: Dec. 3, 2008

(65) Prior Publication Data

US 2009/0143012 A1 Jun. 4, 2009

(30) Foreign Application Priority Data

Dec. 4, 2007 (KR) .................. 10-2007-0124691

(51) Int. Cl.
*H04B 7/00* (2006.01)
(52) U.S. Cl. .................................... 455/41.2
(58) Field of Classification Search .............. 455/41.2
See application file for complete search history.

(56) References Cited

U.S. PATENT DOCUMENTS 6,856,789 B2* 2/2005 Pattabiraman et al. ...... 455/41.2

* cited by examiner

*Primary Examiner* — Lincoln Donovan
*Assistant Examiner* — Daniel Rojas
(74) *Attorney, Agent, or Firm* — Jefferson IP Law, LLP

(57) ABSTRACT

A Bluetooth-enabled mobile terminal and fast device connection method is provided for reducing device connection latency and power consumption. The device connection method includes inquiring of devices by broadcasting an inquiry at an inquiry Power Control Level (PCL), requesting the devices responded to the inquiry for remote names by transmitting a remote name request, determining whether a device is selected among the devices responded to the remote name request, determining, when a device is selected, whether the selected device is a pre-paired device, attempting, when the selected device is a pre-paired device, pairing with the selected device at a preset PCL, and attempting, when the selected device is not a pre-paired device, pairing with the selected device at the inquiry PCL set for broadcasting the inquiry.

15 Claims, 5 Drawing Sheets

BLUETOOTH-ENABLED MOBILE TERMINAL AND FAST DEVICE CONNECTION METHOD THEREOF

CLAIMS OF PRIORITY

This application claims the benefit under 35 U.S.C. §119 (a) of a Korean patent application filed in the Korean Intellectual Property Office on Dec. 4, 2007 and assigned Serial No. 2007-0124691, the entire disclosure of which is hereby incorporated by reference.

BACKGROUND OF THE INVENTION

1. Field of the Invention

The present invention relates to Bluetooth communication. More particularly, the invention relates to a Bluetooth-enabled mobile terminal and fast device connection method thereof that is capable of reducing device connection latency and power consumption.

2. Description of the Related Art

With the increasing interest in wireless personal area networks, various short range wireless communication technologies have been developed and commercialized. Bluetooth is one of the radio-based communication standards. Bluetooth operates in an open 2.4 GHz Industrial, Scientific, and Medical (ISM) band and offers a distance range from 10 to 100 meters with the data rate from 1 to 2 megabits per second. Because of this low power consumption feature, Bluetooth modules are increasingly applied to a wide variety of commercial and industrial fields.

Typically, Bluetooth establishes a radio link between two Bluetooth-enabled devices through a series of procedures: a connection inquiry procedure in which the device intended to play role of master broadcasts an Inquiry message, receives Inquiry Response (Inquiry_res) messages transmitted by the devices dedicated to play rolls of slave, transmits a Remote Name Request message to each of the devices, and receives Remote Name Request Response (Remote Name Request_res) messages, a paging procedure in which the master device transmits a Page message to a target device and receives a Page Response (Page_res) message from the target device, and a pairing procedure in which the master device transmits a Pairing message to the target device and receives a Pairing Response (Pairing_res) message.

In the connection Inquiry procedure, the master device searches the slave devices randomly. Accordingly, when the slave devices are located at a threshold distance or a relatively far distance, the master device is likely to fail to receive the Remote Name Response message or receive the Remote Name Response message with several-second delay.

In the case of no receipt of the Remote Name Response message, the master device retransmits the Remote Name Request message up to three times, resulting in a delay of response time.

Also, the conventional Bluetooth device is configured to transmit the Inquiry and Remote Name Request messages at a uniform transmission power, i.e. a fixed Power Control Level (PCL), for searching for the devices located far away, thereby wasting transmission power.

SUMMARY OF THE INVENTION

An aspect of the present invention is to address at least the above-mentioned the problems and/or disadvantages and to provide at least the advantages described below. Accordingly, an aspect of the present invention is to provide a Bluetooth-enabled mobile terminal and fast device connection method thereof that is capable of facilitating searching for other devices.

Another aspect of the present invention is to provide a Bluetooth-enabled mobile terminal and fast device connection method thereof that is capable of conserving power by transmitting Inquiry and Remote Name Request message through stepwise PCL control.

Yet another aspect of the present invention is to provide a Bluetooth-enabled mobile terminal and fast device connection method thereof that is capable of reducing power consumption by maintaining the PCL at which the connection to a target device after the connection establishment.

In accordance with an aspect of the present invention, a device connection method of a mobile terminal for establishing a wireless connection to another device is provided. The method includes inquiring devices by broadcasting an inquiry at an inquiry power control level, requesting the devices responded to the inquiry for remote names by transmitting a remote name request, determining whether a device is selected among the devices responded to the remote name request, determining, when a device is selected, whether the selected device is a pre-paired device, attempting, when the selected device is a pre-paired device, pairing with the selected device at a preset power control level, and attempting, when the selected device is not a pre-paired device, pairing with the selected device at the inquiry power control level set for broadcasting the inquiry.

In accordance with another aspect of the present invention, a mobile terminal is provided. The terminal comprises a Bluetooth module for establishing a Bluetooth link with a Bluetooth device, and a control unit for inquiring Bluetooth devices in the vicinity by broadcasting an inquiry at a power control level, for requesting the Bluetooth devices responded to the inquiry by transmitting a remote name request, for detecting selection of a device is among the devices responded to the remote name request, for determining whether the selected device is pre-paired, for attempting, when the selected device is a pre-paired device, pairing with the selected device at a preset power control level, and for attempting, when the selected device is not a pre-paired device, pairing with the selected device at the inquiry power control level.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

In the following, the fast device connection method of the present invention is described in association with a mobile terminal equipped with a Bluetooth module. The mobile terminal can be any of a mobile phone, a cordless phone, a Portable Multimedia Player (PMP), a Personal Digital Assistant (PDA), a Smart phone, an MP3 player, and the like.

Figure 1:
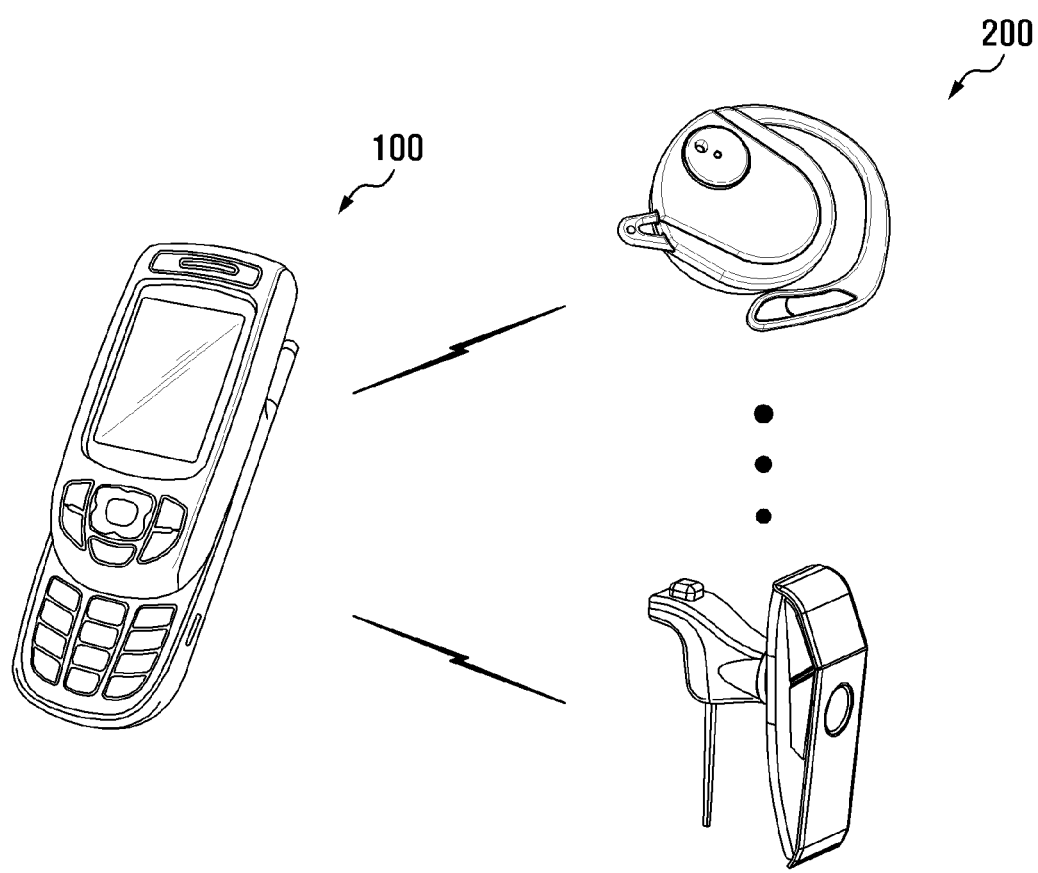
FIG. 1 is a schematic diagram illustrating Bluetooth connectivity of a mobile terminal according to an exemplary embodiment of the present invention.

FIG. 1 is a schematic diagram illustrating Bluetooth connectivity of a mobile terminal according to an exemplary embodiment of the present invention.

Referring to FIG. 1, the mobile terminal 100 includes a wireless communication module (not shown) to establish a personal area network with various devices 200 enabled by the same short range wireless communication technology. The personal area network can be implemented with any of Infrared Data Association (IrDA), ZigBee, and equivalent short area network technologies as well as Bluetooth.

Bluetooth operates in the 2.4 GHz Industrial, Scientific, and Medical (ISM) band which is an unlicensed band intended for low data rate communications. Bluetooth uses a lower guard band of 2 MHz and an upper guard band of 3.5 MHz to avoid interference with other non-Bluetooth devices. Also, Bluetooth uses a frequency hopping technique in which a nominal hop frequency is 1600 hops/s.

In a Bluetooth communication mode, the mobile terminal 100 operates on a Power Control Level (PCL) as low as possible. The mobile terminal 100 broadcasts an inquiry at the initial PCL and transmits remote name request messages to the devices responded to the inquiry. Next, the mobile terminal 100 lists the names of devices that a user may select as a target device for pairing. If no device is selected, the mobile terminal 100 retries the inquiry and remote name request at a higher PCL. Since the inquiry and device name acquisition process is performed in a nearest device-first discovery manner by incrementing the PCL stepwise, the mobile terminal 100 finds a target device quickly, resulting in a reduction of connection latency and power consumption. When a specific device is selected from the device list, the mobile terminal 100 performs pairing with the selected device at the PCL which has been successful in discovering the selected device, and maintains the PCL level during the connection to the selected device, thereby further reducing the power consumption.

When a device is selected from the device list (e.g. names of the devices discovered in the inquiry and device name acquisition process), the mobile terminal 100 performs pairing with the selected device at the PCL level set in the inquiry and device name acquisition process. Here, an error may occur when the target device discovered at the initial PCL moves out of the range defined by the initial PCL after the inquiry and device name acquisition process. In this case, the mobile terminal 100 retries the inquiry and remote name request at a higher PCL to discover the target device.

The mobile terminal 100 may also support various services such as a voice communication, a Short Message Service (SMS), and a Multimedia Message Service (MMS), and functions such as camera and multimedia playback functions.

The devices 200 are Bluetooth-enabled devices such as a stereo headset a hands free ear set and the like. The Bluetooth devices 200 are implemented with a Bluetooth module. The personal area network between the mobile terminal 100 and devices 200 may be implemented with another short range wireless technology such as IrDA, ZigBee, and Ultra WideBand (UWB).

The structures and functions of the mobile terminal 100 are described hereinafter in more detail.

Figure 2:
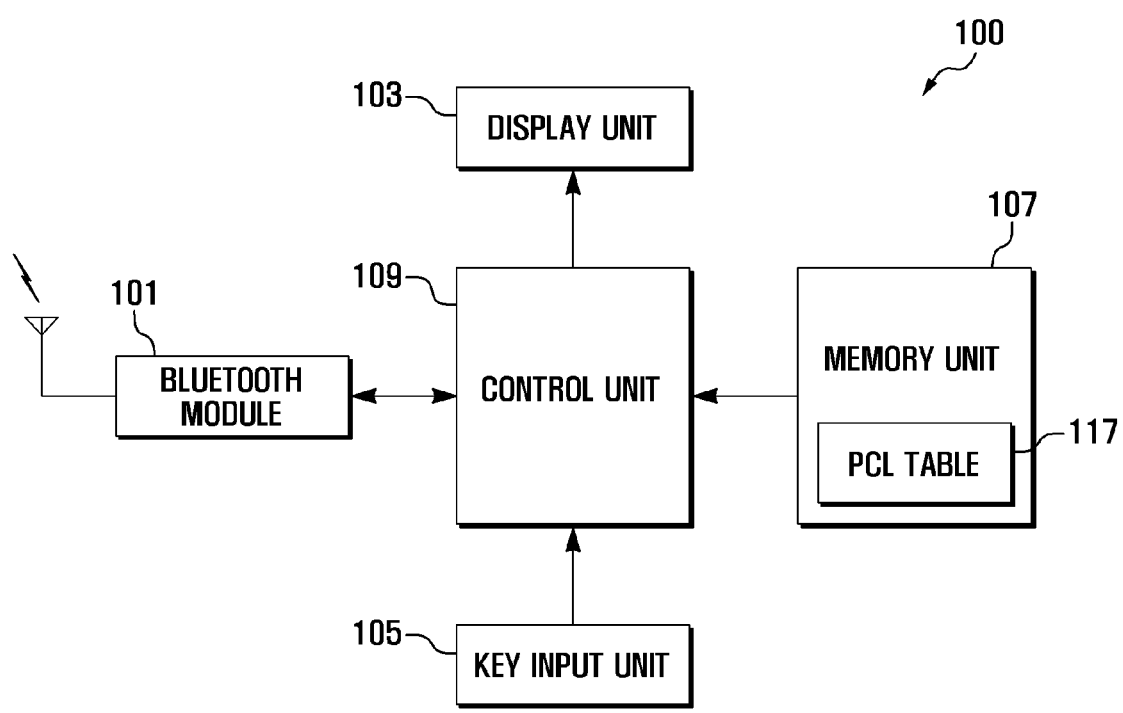
FIG. 2 is a block diagram illustrating a configuration of the mobile terminal according to an exemplary embodiment of the present invention.

FIG. 2 is a block diagram illustrating a configuration of a mobile terminal according to an exemplary embodiment of the present invention.

Referring to FIG. 2, the mobile terminal 100 includes a Bluetooth module 101, a display unit 103, a key input unit 105, a memory unit 107, and a control unit 109.

The Bluetooth module 101 is responsible for establishing a Bluetooth link with another Bluetooth device. The Bluetooth module 101 exchanges control signals with a peer Bluetooth module of the other Device through the Bluetooth link and transfers the received control signals to the control unit 109. The Bluetooth module 101 may include an analysis function for analyzing the received control signals.

The Bluetooth module 101 collects information on the devices discovered in the inquiry and device name acquisition process. The device information includes a Bluetooth address (BD_ADDR), a Class of Device, a Page Scan Repetition Mode, a Page Scan Mode, and a Clock Offset. The Bluetooth module 101 collects User Friendly Names transmitted by the Bluetooth devices in response to the Remote Name Request message.

The display unit 103 displays the status of the mobile terminal 100. Particularly in this exemplary embodiment, the display unit 103 is configured to display a list of addresses of the devices discovered in the inquiry process. The display unit 103 also can display the device names in the form of a list. The display unit 103 may be provided as a Liquid Crystal Display (LCD). In this case, the display unit 103 may include a controller for controlling the LCD, a video memory in which image data is stored and an LCD element. If the LCD is provided as a touch screen, the display unit 103 may perform a part or all of the functions of the key input unit 105.

The key input unit 105 is provided with a plurality of alphanumeric and functions keys for receiving user input. Particularly in this exemplary embodiment, the key input unit 105 is configured to manipulate Bluetooth communication mode settings, a device selection from the device list, a Bluetooth connection mode initialization, and displaying of recently connected device list.

The memory unit 107 stores application programs and information associated with the operation of the mobile terminal 100. Particularly in this exemplary embodiment, the memory unit 107 stores a PCL level table 117. The PCL table 117 is formatted as illustrated in Table 1.

TABLE 1

| | PCL | | | | | |
|---|---|---|---|---|---|---|
| | PCL1 | PCL2 | PCL3 | PCL4 | PCL5 | PCL6 |
| Max Power | 3.0 dBm | −1.3 dBm | −5.5 dBm | −9.3 dBm | −13.5 dBm | −17.0 dBm |
| Power Class Level Difference | N/A | PCL1 – PCL2: 4.3 dBm | PCL2 – PCL3: 4.2 dBm | PCL3 – PCL4: 3.8 dBm | PCL4 – PCL5: 4.2 dBm | PCL5 – PCL6: 3.5 dBm |

As shown in Table 1, an exemplary power control method is performed with 6 power control levels (PCLs). The lowest level is PCL6 at which maximum power is −17.0 dBm. Although Table 1 shows a format of an exemplary PCL table 117, the PCL table is not limited thereto, but can be formed in various formats.

The memory unit 107 also stores mappings between PCLs and devices responded at corresponding PCLs. That is, the memory unit 107 stores the mappings between the PCLs and devices responded to the inquiry transmitted by the mobile terminal 100 at respective PCLs in the form of a table.

The control unit 109 controls operations of the internal components of the mobile terminal 100. When the Bluetooth module 101 is activated, the control unit 109 initializes transmission power at the lowest PCL (in this exemplary embodiment, PCL6) and performs the inquiry and device name acquisition process at the PCL6. When no target device is selected in a preset time, the control unit 109 performs the inquiry and device name acquisition process at the next PCL, i.e. PCL5. That is, the control unit 109 repeats the inquiry and device name acquisition process after incrementing the PCL when a target device is not selected by the user.

When a target device is selected from the device list, the control unit 109 attempts pairing with the target device at the PCL with which the target device is discovered. For example, if the target device is discovered in the inquiry and device name acquisition process performed at the PCL4, the control unit 109 attempts pairing with the target device at the PCL4.

When a target device is selected from the device list, the control unit 109 refers to the mapping between the target device and the PCL at which the target device is discovered and attempts pairing with the target device at the referred PCL. If the pairing attempt fails, the control unit 109 performs the inquiry and device name acquisition process again at the next higher PCL.

The mobile terminal 100 may further includes a Radio Frequency (RF) unit. The RF unit includes an RF transmitter (not shown) for up-converting and amplifying transmission signals and an RF receiver (not shown) for low noise amplifying and down-converting receives signals.

A device connection method of the above structured mobile terminal is described hereinafter in more detail.

Figure 3:
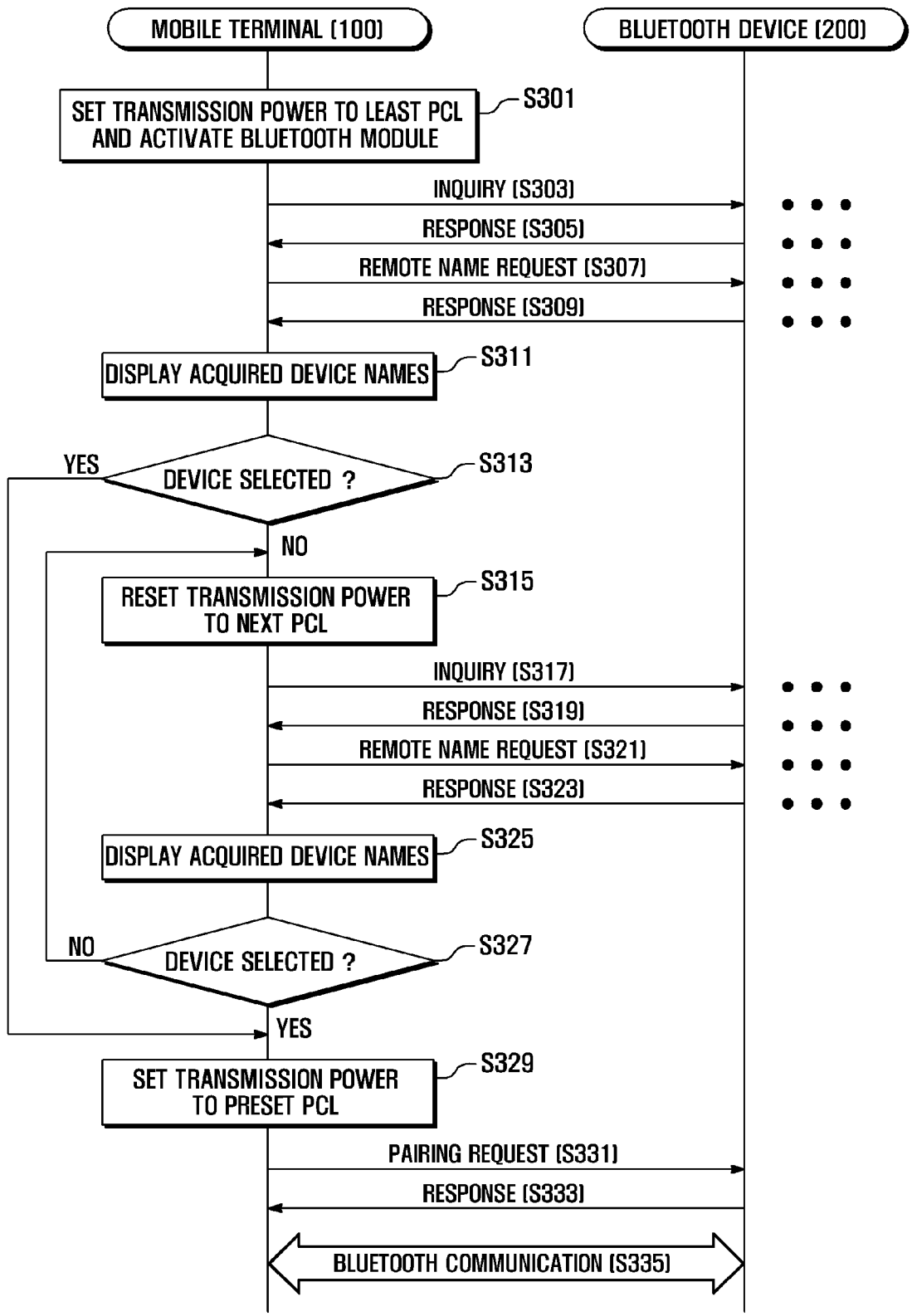
FIG. 3 is a message flow diagram illustrating a device connection method of a Bluetooth-enabled mobile terminal according to an exemplary embodiment of the present invention.

FIG. 3 is a message flow diagram illustrating a device connection method for a Bluetooth-enabled mobile terminal according to an exemplary embodiment of the present invention.

Referring to FIG. 3, once the Bluetooth activation is requested by a user, the mobile terminal 100 enters a Bluetooth communication mode in which the mobile terminal initializes the PCL and activates the Bluetooth module 101 in step S301. In this exemplary embodiment, the Bluetooth communication mode is an operation mode of the mobile terminal 100 for Bluetooth communication with other Bluetooth devices. As described above, the PCLs are stored within the memory unit 107 in the form of the PCL table 117. Here, the initial PCL is set to the lowest PCL, i.e. PCL6 in table 1.

Next, the mobile terminal 100 broadcasts an Inquiry at the lowest transmission power level of the PCL6 in step S303. The Inquiry is broadcasted to discover Bluetooth devices 200 in the vicinity.

The Bluetooth device 200 receives the Inquiry and transmits an Inquiry response (Inquiry_res) to the mobile terminal 100 in step S305. The Inquiry response contains a Bluetooth address which is a unique identifier of the Bluetooth device 200, a type of device, a page scan repetition mode, a page scan mode, and clock offset information. In order to simplify the explanation, it is assumed that only one Bluetooth device 200 responds to the Inquiry in this exemplary embodiment.

Upon receipt of the Inquiry response, the mobile terminal 100 transmits a Remote Name Request to the Bluetooth device 200 in step S307. Here, the mobile terminal 100 transmits the Remote Name Request at the PCL6 with which it succeeds in receiving the Inquiry response from the Bluetooth device 200. The Remote Name Request is transmitted to acquire a user friendly name of the Bluetooth device 200 responded to the Inquiry. Since the Inquiry and Device name acquisition process is performed successfully at the lowest PCL, the mobile terminal 100 saves transmission power while finding a target device. In most cases, a Bluetooth connection is intended with the nearest device, whereby the nearest device first search policy, in which transmission power is as low as possible, is preferred.

In response to the Remote Name Request, the Bluetooth device 200 transmits a response (Remote Name Request_res) in step S309. After receiving the response from the Bluetooth device 200, the mobile terminal 100 displays the user friendly names of the Bluetooth devices 200 responded to the Remote Name Request in the form of a device list in step S311. At this time, the mobile terminal 100 refers to the mappings between the devices responded to the Remote Name Request and PCL (e.g. PCL6) at which the Remote Name Request is transmitted. The mappings are stored within the memory unit 107. That is, the mobile terminal 100 stores a mapping table listing the mappings between the PCLs and devices responded to the Remote Name Requests transmitted at the respective PCLs.

While the device list is displayed, the mobile terminal 100 determines whether a specific device is selected from the device list in step S313. The user can select a target device from the device list by selection command through the input unit 105. If a specific device has been selected from the device list, the mobile terminal 100 performs pairing with the selected device at the same PCL in step S329.

In contrast, if no device has been selected from the device list, the mobile terminal 100 increments the PCL by 1 level in step S315 and broadcasts the Inquiry at the new PCL in step S317. That is, the mobile terminal 100 resets the transmission power to PCL5 and broadcast the Inquiry at the PCL5.

The Bluetooth devices received the Inquiry at step S317 transmit Inquiry responses to the mobile terminal 100 in step S319. Upon receipt of the responses, the mobile terminal 100 transmits the Remote Name Request at the same PCL, i.e. PCL5 in step S321, and receives responses from the Bluetooth devices in response to the Remote Name Request in step S323.

Next, the mobile terminal 100 displays the device list updated with reference to the Remote Name Request responses on the display unit 103 in step S325. At this time, the mobile terminal 100 stores the device names within the memory unit 107 together with the PCL at which the devices have responded.

Next, the mobile device 100 determines whether a specific device is selected from the updated device list in step S327. If no device has been selected in a preset time, the mobile terminal 100 returns to step S315 to expand the search range. That is, the mobile terminal 100 increments the PCL by 1 level, i.e. to PCL4 and performs the Inquiry and Device name acquisition process again at the PCL4.

In contrast, if a device has been selected at step S327, the mobile terminal 100 sets the transmission power to PCL4 in step S329. The user can select the target device from the device list displayed on the display unit through key manipulation on the key input unit 105. At this time, the mobile terminal 100 sets the transmission power to the PCL at which the Remote Name Request is transmitted.

Next, the mobile terminal 100 transmits a Pairing request to the target device 200 in step S331 and receives a Pairing response from the target device 200 in response to the Pairing request in step S333, whereby a Bluetooth communication link is established between the mobile terminal 100 and the target device 200 in step S335. While the mobile terminal 100 and the target device 200 are connected through the Bluetooth link, the mobile terminal maintains the PCL set at step S329.

Figure 4:
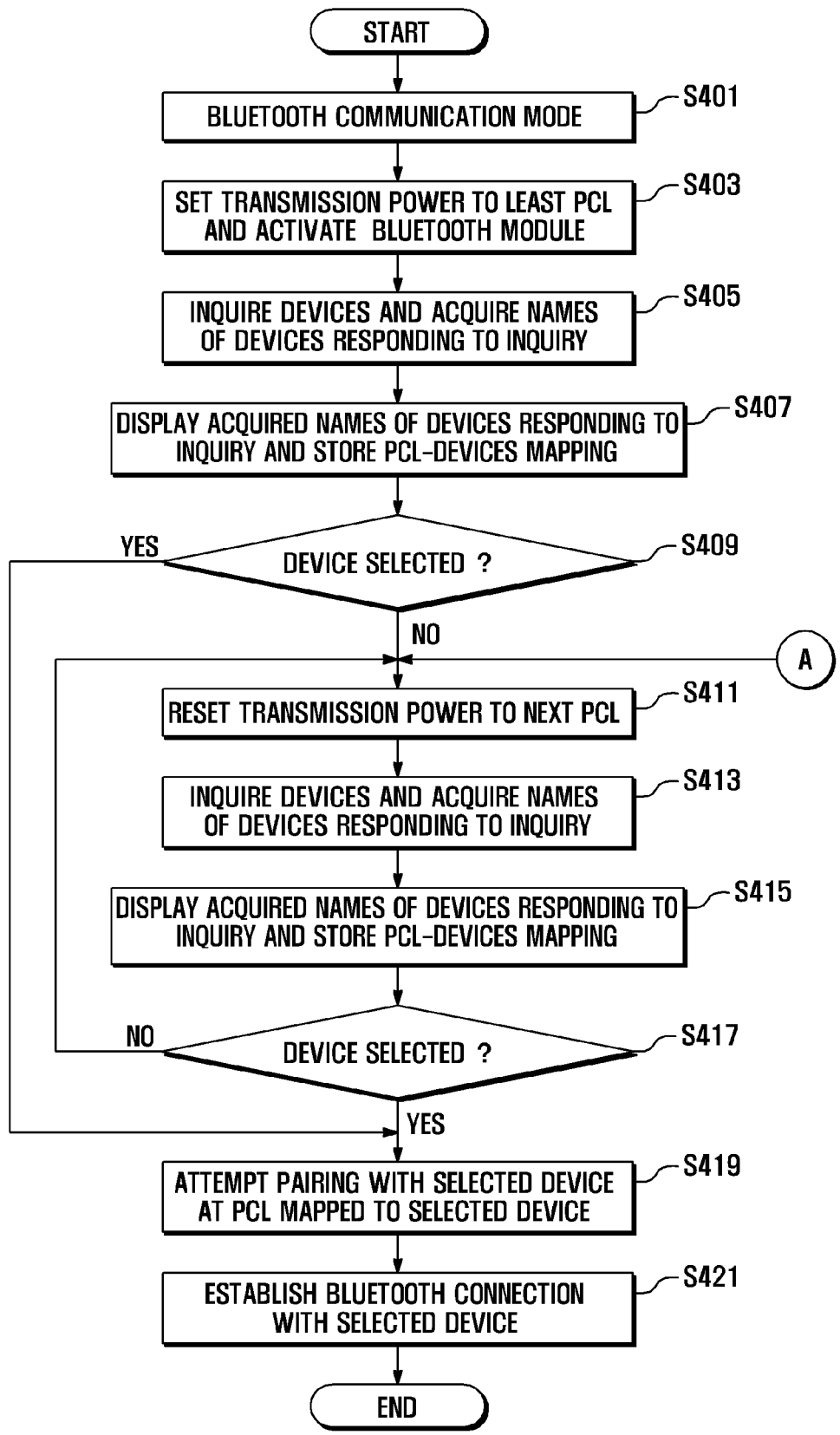
FIG. 4 is a flowchart illustrating an un-paired device connection procedure of a fast device connection method of a Bluetooth-enabled mobile terminal according to an exemplary embodiment of the present invention.

FIG. 4 is a flowchart illustrating an un-paired device connection procedure of a fast device connection method of a Bluetooth-enabled mobile terminal according to an exemplary embodiment of the present invention.

Referring to FIG. 4, when the Bluetooth communication mode is set to turn on in the mobile terminal 100 in step S401, the control unit 109 of the mobile terminal 100 sets the transmission power of Bluetooth radio to an initial PCL and activates the Bluetooth module 101 in step S403. The Bluetooth communication mode is set by a user on a Bluetooth setting menu screen. Once the Bluetooth communication mode is turned on, the control unit 109 sets the initial PCL of the Bluetooth radio and activates the Bluetooth module 101. In this exemplary embodiment, the initial PCL is PCL6.

Next, the control unit 109 broadcasts an Inquiry to discover Bluetooth devices in the vicinity and transmits a Remote Name Request to the Bluetooth devices responded to the Inquiry in step S405.

The control unit 109 receives the responses to the Remote Name Request in a preset time, displays the remote names of the Bluetooth devices acquired from the responses on the display unit 103, in the form of a device list, maps the Bluetooth devices responded to the Remote Name Request to the PCL at which the Inquiry and Remote Name Request are transmitted, and stores the mapping in the memory unit 107 in step S407. Since the Inquiry and Remote Name Request have been transmitted at the PCL6 at first, the Bluetooth devices responded to the Remote Name Request are mapped to the PCL6.

While displaying the device list, the control unit 109 determines whether a specific device is selected from the device list in a preset time in step S409. If a specific device has been selected at step S409, the control unit 109 attempts pairing with the selected device at the PCL mapped to the device in step S419.

In contrast, if no device has been selected in the preset time, the control unit 109 resets the transmission power of the Bluetooth radio at the next PCL in step S411. Next, the control unit 109 broadcasts the Inquiry and transmits the Remote Name Request to the Bluetooth devices responded to the Inquiry at the next PCL in step S413. Here, the next PCL is PCL5.

Next, the control unit 109 receives the responses to the Remote Name Request in a preset time, displays the remote names of the Bluetooth devices acquired from the responses on the display unit 107, maps the Bluetooth devices responded to the Remote Name Request to the PCL5, and stores the mapping in the memory unit 107 in step S415. That is the Bluetooth devices responded to the Remote Name Request at PCL5 are mapped to the PCL5.

Next, the control unit 109 determines whether a specific device is selected from the device list in the preset time in step S417. If no device has been selected at step S417, the control unit 109 returns to step S411. Otherwise, if a specific device has been selected at step S417, the control unit 109 attempts pairing with the selected device at the PCL5 mapped to the device in step S419.

After completing the paring, a Bluetooth link is established between the mobile terminal 100 and the device in step S421.

Figure 5:
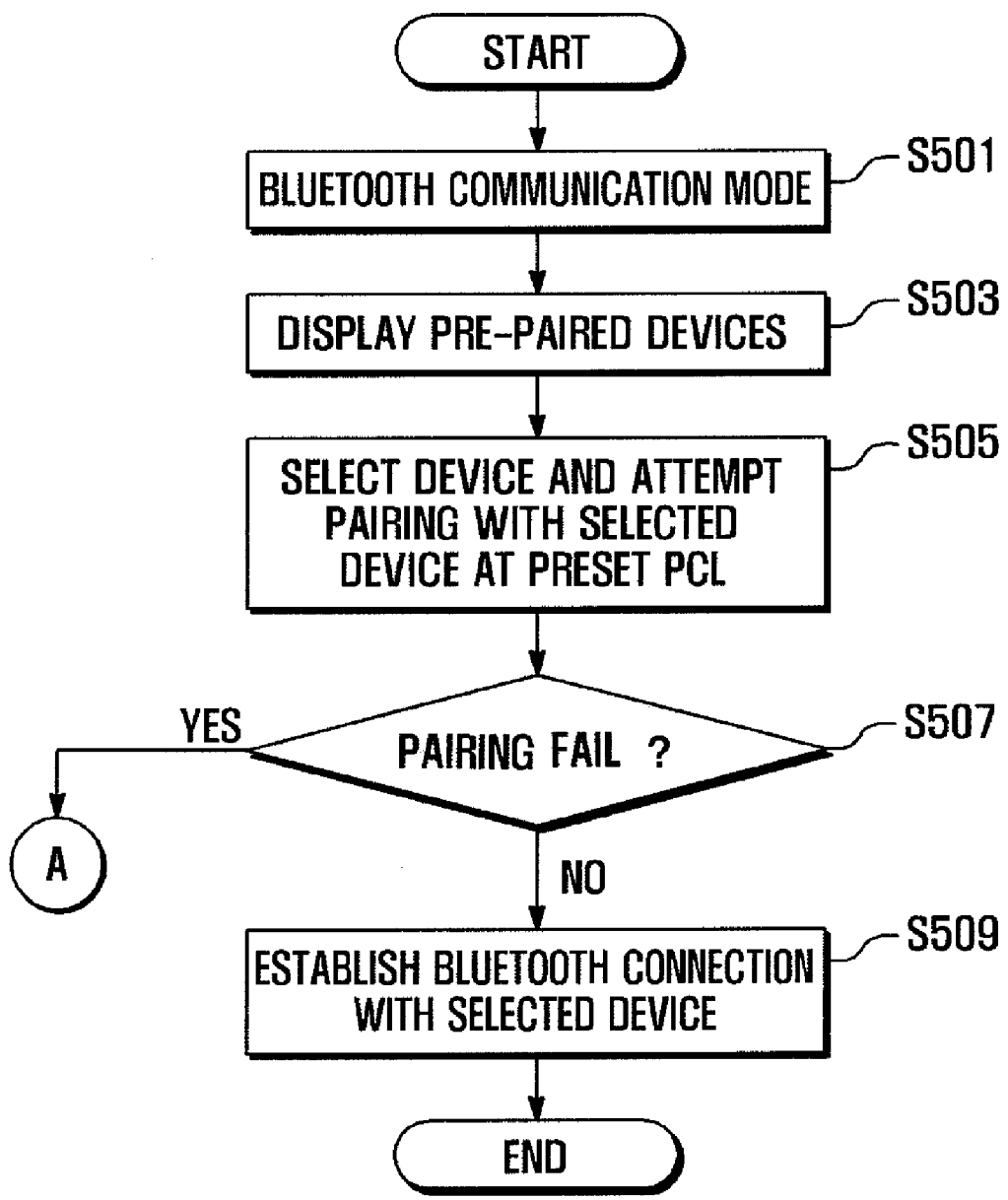
FIG. 5 is a flowchart illustrating a pre-paired device connection procedure of a fast device connection method according to another exemplary embodiment of the preset invention.

FIG. 5 is a flowchart illustrating a pre-paired device connection procedure of a fast device connection method according to an exemplary embodiment of the preset invention.

FIG. 5 illustrates a pre-paired device connection procedure, whereas FIG. 4 illustrates an unpaired device connection procedure.

Referring to FIG. 5, the control unit 109 detects the activation of the Bluetooth communication mode of the mobile terminal in step S501 and displays a pre-paired device list on the display unit 103 in response to a user request in step S503. The pre-paired device list is displayed according to a series of selections of Bluetooth and recently connected devices menu items.

Next, the control unit 109 detects a selection of a device from the pre-paired device list and attempts pairing with the selected device at the PCL mapped to the selected device in step S505. As described above, the mapping information between the pre-paired Bluetooth devices and PCLs at which the Inquiry process has succeeded is stored in the memory unit 107. Accordingly, the control unit 109 attempts pairing with the selected device at the PCL at which the Inquiry process has succeed before.

Next, the control unit 109 determines whether the pairing fails in step S507. If the pairing fails, the control unit 109 returns to step S411 of FIG. 4. That is, when the pairing attempt fails at the previously succeeded PCL, the control unit 109 attempts pairing with the selected device after incrementing the PCL.

In contrast, if the pairing has succeeded, the control unit 109 establishes a Bluetooth link with the selected device in step S509.

Although the present invention has been shown and described with reference to certain exemplary embodiments hereinabove, it should be clearly understood by those skilled in the art that various changes in form and details may be made therein without departing from the spirit and scope of the present invention as defined in the appended claims and their equivalents.

As described above, the Bluetooth-enabled mobile terminal and fast device connection method of the present invention performs an Inquiry and device name acquisition process at a PCL as low as possible, thereby reducing device connection latency and power consumption.

Also, the Bluetooth-enabled mobile terminal and fast device connection method of the present invention establishes and maintains a Bluetooth connection with a device at the PCL with which the Inquiry and device name acquisition has succeed, resulting in further power saving.

What is claimed is:

1. A device connection method of a mobile terminal for establishing a wireless connection, the method comprising:
   inquiring of devices by broadcasting an inquiry at an inquiry Power Control Level (PCL);

requesting the devices responded to the inquiry for remote names by transmitting a remote name request;
determining whether a device is selected among the devices responded to the remote name request;
determining, when a device is selected, whether the selected device is a pre-paired device;
attempting, when the selected device is a pre-paired device, pairing with the selected device at a preset PCL; and
attempting, when the selected device is not a pre-paired device, pairing with the selected device at the inquiry PCL set for broadcasting the inquiry.

2. The method of claim 1, wherein the inquiry PCL is the least PCL, and the preset PCL is a PCL at which the selected device is successfully paired in a previous pairing process.

3. The method of claim 1, further comprising establishing and maintaining a radio connection with the selected device at the PCL with which the mobile terminal has paired with the selected device.

4. The method of claim 1, further comprising mapping the inquiry PCL with the devices responded to the inquiry at the PCL in a table.

5. The method of claim 4, further comprising:
displaying a pre-paired device list in response to a user request;
attempting, when a device is selected from the pre-paired device list, pairing with the selected device at the PCL mapped to the selected device; and
inquiring, when the pairing with the selected device fails, devices at an inquiry PCL which is higher than the mapped PCL.

6. A mobile terminal, the terminal comprising:
a Bluetooth module for establishing a Bluetooth link with a Bluetooth device; and
a control unit for inquiring of Bluetooth devices in the vicinity by broadcasting an inquiry at an inquiry Power Control Level (PCL), for requesting the Bluetooth devices responded to the inquiry for remote names by transmitting a remote name request, for detecting selection of a device among the devices responded to the remote name request, for determining whether the selected device is pre-paired, for attempting, when the selected device is a pre-paired device, pairing with the selected device at a preset PCL, and for attempting, when the selected device is not a pre-paired device, pairing with the selected device at the inquiry PCL.

7. The terminal of claim 6, wherein the inquiry PCL is the least PCL, and the preset PCL is a PCL at which the selected device is successfully paired in a previous pairing process.

8. The terminal of claim 6, wherein the control unit activates the Bluetooth module to establish the Bluetooth link with the Bluetooth device at the PCL with which the mobile terminal has paired with the selected device.

9. The terminal of claim 6, further comprising a memory unit for storing mappings between PCLs and Bluetooth devices responded to the inquiry at respective PCLs.

10. The terminal of claim 9, wherein the memory unit comprises a PCL table for storing PCLs.

11. The terminal of claim 9, wherein the control unit displays a pre-paired device list in response to a user request, attempts, when a device is selected from the pre-paired device list, pairing with the selected device at the PCL mapped to the selected device, and inquires, when pairing with the selected device has failed, devices at an inquiry PCL which is higher than the mapped PCL.

12. A device connection method of a mobile terminal for establishing a wireless connection, the method comprising:
setting a transmission power to an initial Power Control Level (PCL);
broadcasting an inquiry to discover devices in the vicinity and transmitting a Remote_Name_Request to the devices responded to the inquiry;
receiving responses to the Remote_Name_Request in a preset time, displaying a list of the devices acquired from the responses, and mapping the devices responded to the Remote_Name_Request to the initial PCL;
determining whether a specific device is selected from the list in a preset time;
attempting pairing with the selected device at the PCL mapped to the device; and
establishing the wireless connection between the mobile terminal and the device.

13. The method of claim 12, further comprising storing PCLs in a PCL level table of a memory unit.

14. The method of claim 13, further comprising, if a specific device is not selected from the list in a preset time, resetting the transmission power at the next PCL in the PCL level table, broadcasting an inquiry to discover devices in the vicinity and transmitting a Remote_Name_Request to the devices responded to the inquiry, receiving responses to the Remote_Name_Request in a preset time, displaying a list of the devices acquired from the responses, and mapping the devices responded to the Remote_Name_Request to the PCL.

15. The method of claim 12, further comprising storing the mapping in a memory unit.

* * * * *